UNITED STATES PATENT OFFICE.

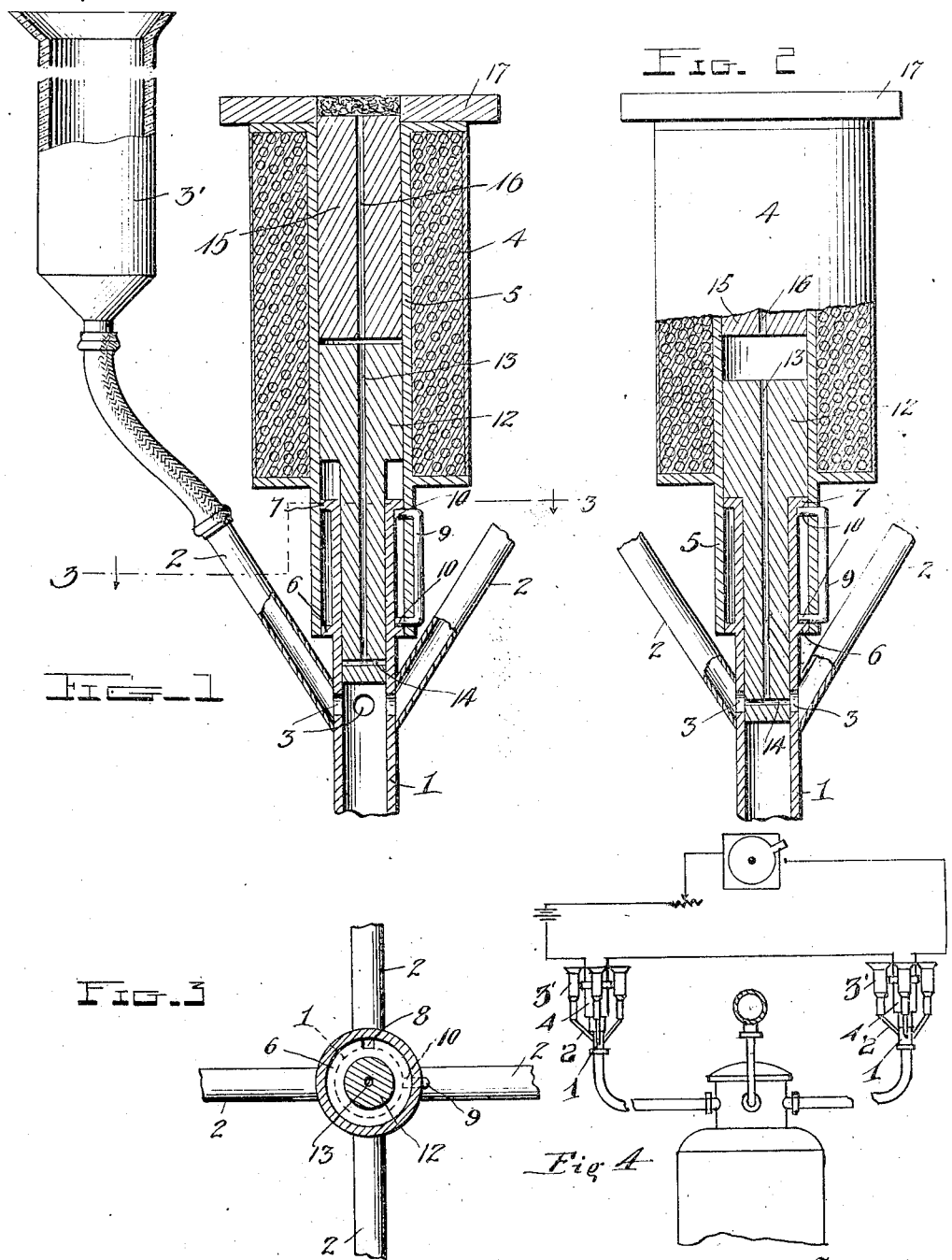

LEE W. BADGER AND EDWIN J. BADGER, OF BELLEFONTAINE, OHIO.

ELECTROMAGNETIC PULSATOR FOR MILKING-MACHINES.

934,263.

Specification of Letters Patent. Patented Sept. 14, 1909.

Application filed January 6, 1908. Serial No. 409,575.

*To all whom it may concern:*

Be it known that we, LEE W. BADGER and EDWIN J. BADGER, citizens of the United States, residing at Bellefontaine, in the county of Logan and State of Ohio, have invented certain new and useful Improvements in Electromagnetic Pulsators for Milking-Machines; and we do declare the following to be a full, clear, and exact description of the invention, such as will enable others skilled in the art to which it appertains to make and use the same.

This invention relates to improvements in electromagnetic pulsators for milking machines.

The object of the invention is to provide an electrically operated plunger valve adapted to work in a vacuum tube of a milking machine to intermittently break the vacuum in the milk tubes which connect with the teat cups, thereby alternately relieving the vacuum or suction and applying the same at the proper intervals and for the proper length of time to produce the desired results.

With this object in view, the invention consists of certain novel features of construction, combination and arrangement of parts as will be described hereinafter and particularly pointed out in the appended claims.

In the accompanying drawings, Figure 1 is a vertical sectional view of a pulsator constructed in accordance with the invention, and showing the plunger valve in open position; Fig. 2 is a similar view showing the valve in closed position; and Fig. 3 is a horizontal sectional view on the line 3—3 of Fig. 1. Fig. 4 is a diagrammatic view showing the manner in which the pulsator is connected with a milk can from which the air is exhausted, and showing the arrangement of the electric circuit and rotary switch for intermittently energizing the electro-magnet of the pulsator.

Referring more particularly to the drawings, 1 denotes the vacuum tube of a milking machine, said tube being suitably connected with a vacuum pump or air exhausting mechanism, not shown. Connected with the vacuum tube 1, near its upper end, is a series of milk conducting tubes, 2, of which there may be any desired number, four of the same being shown in the present instance. The tubes, 2, communicate at their lower ends with combined air exhausting and milk inlet ports, 3, formed in the vacuum tube, as shown. The upper ends of the milk tubes, 2, are connected to teat cups, 3.

To the upper end of the vacuum tube 1 is connected a single electro-magnet, 4, which is provided with a tubular core, 5, the lower end of which projects below the winding of the magnet and is adapted to fit over the upper end of the vacuum tube, as shown. On the vacuum tube 1, above the connection of the milk tubes, 2, is arranged an annular collar, or flange, 6, while on the upper end of the tube is formed an annular flange, 7, in which is formed a notch or cut-out portion 8. In the lower end of the tubular core 5, which fits over the flanges, 6 and 7, is arranged a fixed locking pawl and dog, 9, said pawl being here shown and is preferably in the form of a short bar adapted to be secured to the outer side of the core, 5, adjacent to its lower end. Said bar is provided at its upper and lower ends with inwardly projecting lugs 10 which extend through the side of the core and project into the same a suitable distance. In applying the core to the upper end of the vacuum tube, the inwardly projecting ends of the lugs, 10, are brought into alinement with the notch, 8, in the upper flange, 7, on said vacuum tube, thus permitting said lugs to pass said flange, and the lower end of the core to be slipped downwardly onto the upper end of the vacuum tube until the lowermost lug 10 engages the lower flange, 6, on said vacuum tube, after which the magnet, 4, and core, 5, are given a slight turn in one direction or the other, which will bring the upper lug 10 of the pawl 9 out of alinement with the upper notch, 8, thereby locking the core 5 onto the upper end of the vacuum tube.

Slidably mounted in the upper end of the vacuum tube, 1, is a plunger valve, 12, said valve having a reduced lower end adapted to fit and slide within the upper end of the vacuum tube, said reduced end of the valve being of such length that when the valve is in its lowermost position, with the enlarged upper end thereof resting upon the upper end of the vacuum tube, the lower end of the valve will engage and close the ports, 3, formed in the tube 1, as clearly shown in Fig. 2 of the drawing. In the valve, 12, is formed a centrally disposed air passage, 13, the lower end of which communicates with a transversely disposed passage, 14, the opposite ends of which open through the sides of the valve adjacent to its lower end and communicate with the ports, 3, and milk tubes 2, so that when said valve is in a lowered or operated position, the vacuum in said milk tubes will be broken.

In the upper end of the tubular core 5 of the magnet is arranged a soft iron core 15, which is magnetized when the electric circuit is passed through the magnet and attracts the valve, 12, which is also preferably formed of iron, and takes the place of an armature. When the valve is attracted by the core, 15, it will be drawn upwardly into the core a sufficient distance to raise the lower end thereof above the ports, 3, thus opening communication between the milk tubes, 2, and the lower portion of the vacuum tube, whereby the air is drawn from the tubes, 2, and a vacuum formed therein which will cause a flow of milk. As soon as the electric current is cut off from the magnet, 4, the valve, 12, will be drawn downwardly in the core, 5, and upper end of the vacuum tube by gravity or the suction in the vacuum tube, 1, this action cutting off the ports, 3, and the milk tubes from the vacuum tube, and destroying the vacuum in the milk tube in the manner hereinbefore described. The core, 15, in the upper portion of the magnet is provided with a longitudinally extending bore, 16, which opens to the atmosphere at its upper end and communicates with the upper end of the passage, 13, at its lower end, thus providing for the admission of air through the valve, 12, to the ports, 3, and milk tubes when the valve is in its lowered position.

On the upper end of the magnet, 4, is arranged a plate, 17, to which is connected suitable straps, or other fastening devices, by means of which the magnet and the ports connected thereto are suspended in suitable position beneath the cow's udder. The magnet, 4, is preferably arranged in a variable resistance circuit, in which is also arranged a switch as diagrammatically illustrated in Fig. 4 of the drawing, which is operated mechanically at any desired uniform speed, to intermittently energize and deënergize the magnet, 4, thereby causing the same to alternately attract and release the valve, which will cause the pulsations of air in the milk tubes and thereby draw the milk from the cow through said tubes and into the vacuum tube, 1.

By a proper manipulation of the switch in the electric circuit, the vacuum pressure will be admitted to and shut off from the milk tubes at the proper speed and the pressure applied for the proper length of time for drawing the milk without injury to the cow.

In using the device, it is intended to connect two of the pulsators to each milk can from which the air has been exhausted, thereby providing for the milking of two cows at the same time into each can.

If desired, we may place in the upper end of the hollow core, 5, above the soft iron core, 15, a filling 18 of absorbent cotton or other suitable filtering material through which the relief air must pass before entering the passages, 16 and 13, in the core, 15, and valve, 12, thus purifying this air entering the milk tubes.

Having thus particularly described our invention, what we claim as new and desire to secure by Letters-Patent, is:

1. In a pulsator for milking machines, a vacuum tube, a plurality of milk conducting tubes connected to said vacuum tube, a plunger valve slidably mounted in the upper end of said vacuum tube, and adapted to cut off communication between said milk tubes and said vacuum tube, said valve having arranged therein an air conducting passage adapted to communicate with said milk tube when the valve is in a closed position, an electro-magnet having a tubular core adapted to be engaged with the upper end of said vacuum tube, and a soft iron core arranged in the upper end of said tubular core of the magnet and adapted to attract and operate said valve when the magnet is energized substantially as described.

2. In a pulsator for milking machines, a vacuum tube, a plurality of milk conducting tubes connected with said vacuum tube, a plunger valve slidably mounted in the upper end of said vacuum tube, and adapted to cut off communication between said milk tubes and said vacuum tube, said valve having arranged therein an air conducting passage adapted to communicate with said milk tube when the valve is in a closed position, an electro-magnet having a tubular core projecting beyond one end of the same and adapted to be engaged with the upper end of said vacuum tube, means to detachably secure said core onto the upper end of said tube, and a soft iron core arranged in the upper end of said magnet and adapted to attract and release said valve when the magnet is energized and deënergized, said core having formed therein a longitudinally disposed air passage adapted to admit air to the passage in said valve, substantially as described.

3. In a pulsator for milking machines, a vacuum tube having formed therein a series of air and milk passages, locking flanges formed on the upper end of said tube, a plurality of milk conducting tubes connected with said vacuum tubes and communicating with the parts therein, teat cups detachably connected to the outer ends of said tubes, a plunger valve having a reduced lower end adapted to slide in the upper end of said vacuum tube to open and close the ports therein, said valve having air passages formed therein and adapted to communicate with said ports and milk tubes when the valve is in closed position, an electro-magnet having a tubular core projecting beyond one end of the same and adapted to fit over the locking flanges on the upper end of said vacuum tube, a locking pawl arranged in said core and adapted to be engaged with said locking flanges, whereby said core is detachably secured to the upper end of the vacuum tube, and a soft iron core arranged in the upper end of said tubular core of the magnet to attract and operate said valve when the magnet is energized, substantially as described.

4. In a pulsator for milking machines, a vacuum tube, a plurality of milk conducting tubes connected to said vacuum tube, a plunger valve slidably mounted in the upper end of said vacuum tube, and adapted to cut off communication between said milk tubes and said vacuum tube, said valve having arranged therein an air conducting passage adapted to communicate with said milk tube when the valve is in a closed position, an electro-magnet having a tubular core adapted to be engaged with the upper end of said vacuum tube, a soft iron core arranged in the upper end of said tubular core of the magnet and adapted to attract and operate said valve when the magnet is energized, said soft iron core having a passage therethrough, and an air filtering medium arranged in said tubular magnet core above said soft iron core, substantially as described.

5. In a pulsator for milking machines, a vacuum tube, a plurality of milk conducting tubes connected to said vacuum tube, a plunger valve slidably mounted in the upper end of said vacuum tube and adapted to cut off communication between said milk tubes and said vacuum tube, an electro-magnet having cores to receive and operate said valve, said magnet cores and valve having arranged therein air - conducting passages adapted to communicate with said milk tubes when the valve is in a closed position, and means to filter the air entering said passage.

In testimony whereof we have hereunto set our hands in presence of two subscribing witnesses.

LEE W. BADGER.
EDWIN J. BADGER.

Witnesses:
A. TEMPA McCRACKEN,
FLORENCE CANTWELL.